United States Patent Office.

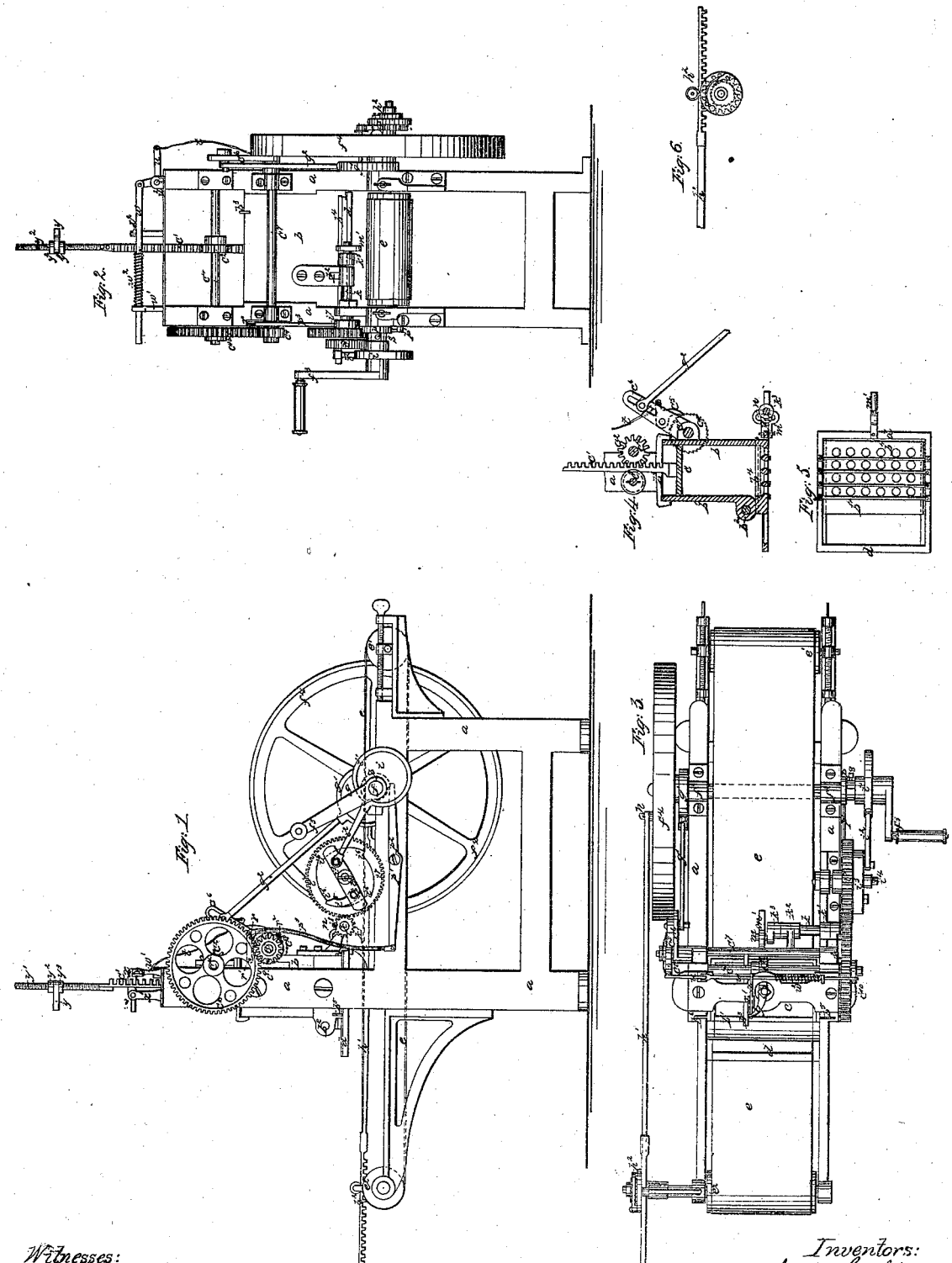

JOHN McCOLLUM AND JOSEPH PARR, OF NEW YORK, N. Y.

*Letters Patent No. 91,759, dated June 22, 1869.*

IMPROVED MACHINE FOR MAKING GINGER-SNAPS AND CRACKERS.

The Schedule referred to in these Letters Patent and making part of the same.

*To all whom it may concern:*

Be it known that we, JOHN McCOLLUM and JOSEPH PARR, both residing in the city and county of New York, and State of New York, have invented certain new and useful Improvements in Machines for Making Ginger-Snaps and Crackers; and we do hereby declare that the following is a full and correct description thereof, reference being had to the accompanying drawings, and to the letters of reference thereon.

Our invention relates to machines for making ginger-snaps, crackers, &c., in which the dough, placed in a dough-box, is pressed in continuous cylindrical strips by a follower through a grating in the bottom of the box, and cut off, by a frame of reciprocating knives, into circular pieces of the proper size, and delivered upon a carrying-apron, or upon pans placed upon a carrying-apron beneath the knives.

The machine to which our improvements are applied is patented by the United States, in Letters Patent issued to Charles Neer, of Troy, New York, dated June 15, 1858.

In said Neer's machine, the dough-box, with its follower, the frame of cutting-wires or knives, and the carrying-apron, are so combined as to co-operate when the follower, frame of knives, and apron, are moved successively by hand, hand-levers being used to operate the follower and frame of knives, and a hand-crank to operate the carrying-apron.

The object of our invention is to operate the above parts automatically from a driving-shaft, in such manner that the follower shall have an intermittent progressive motion downward in the dough-box, the knives an intermittent reciprocating motion, to cut off the cake, and the carrying-apron an intermittent progressive motion, to carry forward the cakes from under the knives, these motions being properly timed, so that the operator, by turning the crank attached to the driving-shaft, (which may also be rotated by a belt,) may turn out the cut cakes with rapidity and facility.

In said Neer's machine, the bottom of the dough-box has a grating, or perforated plate, in which are as many rows of holes as the width of the dough-box and the required size of the cakes permit. This relieves the dough-box and follower from the strain that would occur from the use of only one row of holes, and at the same time gives the machine capacity to supply a greater number of cakes at one movement of the follower; but in working a frame of knives to cut off a number of rows of cakes, the clusters of cakes will be deposited unevenly upon the carrying-apron, if the knives cut in both directions, that is, back and forth alternately, and to remedy this irregularity, we have devised mechanism whereby the frame of knives is moved back and forth at each cut.

Our invention further consists in a regulating-mechanism combined with the mechanism for operating the follower, substantially as hereinafter described.

To give the proper supply of dough to the knives with certainty, and at the time required, it is necessary (the dough being elastic) to move the follower at each step further down than if the dough were not elastic, and then to allow it to return a portion of the distance through which it has been moved, to relieve the dough from the extra pressure, in order to prevent the dough in the box from forcing itself down through the grating while the knives are in action, by reason of its elasticity.

The regulating-mechanism governs the distance through which the follower is allowed to react, to relieve the dough from the extra pressure.

Our invention also consists in combining, with the mechanism for moving the follower, a mechanism, substantially as hereinafter described, for preventing breakage, which might be caused by the follower coming in contact with the bottom of the dough-box.

But, more particularly to describe our invention, we will refer to the accompanying drawings, of which—

Figure 1 is a side elevation,

Figure 2, a front elevation, and

Figure 3, a plan view of the machine.

Figure 4, a detached section of the dough-box, follower, and parts of the mechanism for operating the follower;

Figure 5, a bottom view of the dough-box and frame of knives; and

Figure 6, a detached view, showing details of ratchet-motion for feed-apron.

Letter $a$ represents the frame of the machine; $b$, the dough-box, secured to the frame at the sides, and having its rear plate, $b^1$, hinged at $b^2$, for conveniently opening the dough-box to place dough therein, under the follower $c$, when the latter is raised up in the dough-box for that purpose.

When the dough has been put in the box, the rear plate is raised and secured by a clamp-bar, $b^3$, as shown in the drawings, or may be secured by any other suitable device.

The grating or perforated bottom of the dough-box $b^4$ is removable, being secured in slides by the pins $b^5$ $b^6$, so that gratings having holes of different sizes for different-sized crackers or cakes may be used.

The frame of knives $d$ works in longitudinal slides on the under side of the grating, as in the Neer machine.

The carrying-apron $e$ is placed just below the knives, as in the Neer machine, and is stretched upon two drums, $e^1$ $e^2$, supported in bearings in the bracket extension-frames $a^1$ $a^2$.

The follower $c$ is moved by a rack, $c^1$, and pinion, $c^2$, the former held in place by a flanged wheel, $c^3$, and the latter fast to a shaft, $c^4$, which receives an intermittent progressive motion from a pawl, $c^5$, upon a rocking-lever, $c^6$, which engages a ratchet-wheel, $c^8$, fast to one end of a counter-shaft, $c^7$, which has upon the other end a pinion, $c^9$, which engages with a spur-wheel, $c^{10}$, fast to the aforesaid shaft $c^4$, which carries the rack-pinion.

So far the machine is, in substance, as described and shown in said Neer's patent, with a modified arrangement of the rack-pinion and ratchet-gear for moving the follower. We will now proceed to describe our improvements.

Letter $f$ is a main driving-shaft, which rotates in bearings $f^1$ $f^2$ in the main frame, and has attached to it a hand-crank, $f^3$, at one end, and a fly-wheel, $f^4$, at the other end. The rim of the fly-wheel may be turned flat, as in the drawing, to serve as a driving-pulley with a flat belt, or it may have a groove, for a round belt. The hand-crank may be removed, and a belt-pulley be substituted therefor, but as the machine is made to work comparatively soft doughs, the power of a man upon the hand-crank is sufficient to operate it as rapidly as necessary.

This driving-shaft operates the follower at the required time, by an eccentric, $g$, fixed upon said shaft, and connected with the rocking-lever $c^5$ by a strap, $g^1$, and rod, $g^2$, the latter jointed to the rocking lever by an adjustable stud-pin, $g^4$.

The driving-shaft $f$ also operates the carrying-apron at the required time, by an adjustable crank-pin, $h$, secured in the usual manner in a slot in an arm of the fly-wheel, (not shown in the drawings,) which imparts an intermittent progressive forward movement to the carrying-apron, through the pitman $h^1$ and the ratchet-mechanism $h^2$, connected with the driving-drum $e^2$ of the carrying-apron. The details of this ratchet-motion are shown in fig. 6, and are so well known as not to need minute description.

The frame of knives remains at rest during half a revolution of the main shaft, and is moved forward and back to cut the cakes just after every downward movement of the follower, and before every forward movement of the apron, while the apron is at rest, by mechanism as follows:

An eccentric, $i$, fast to the main shaft $f$, communicates a rocking motion, through the strap $i^1$ and rod $i^2$, to a rocking lever, $i^3$, which is pivoted upon a horizontal stud-pin, $i^4$, and carries a pawl, $i^5$, which latter engages, at each revolution of the shaft $f$, with one of four inclined ratchet-teeth, $i^6$, cut at equal distances apart upon the inside of the rim of a cog-wheel, $i^7$, which turns freely upon the stud-pin $i^4$, being moved by the pawl one-quarter of its circumference at each revolution of the main shaft.

The cog-wheel $i^7$ gears into a smaller cog-wheel, $i^8$, the latter having just one-quarter the number of cog-teeth as in the former, which arrangement causes the short crank-shaft $k$, driven by the smaller cog-wheel, to make a complete revolution during one half revolution of the main shaft, and remain at rest during the other half revolution, while the pawl is returning the requisite distance to pick up the next of the four ratchet-teeth in the wheel $i^7$.

The short crank-shaft $k$, so operated, is placed immediately in front of the frame of knives, supported near one end by a bracket-bearing, $k^1$, attached to the frame $a$, and at the other by a hanger, $k^2$, attached to the dough-box, and has a crank, $k^3$, which connects by a crank-pin, $m$, with the frame of knives, by an arm, $m^1$, in which is cut a vertical slot, $n$, to receive the crank-pin, which plays up and down in the slot as it moves the knife-frame forward and back, to cut and deliver the cakes upon the carrying-apron.

If it is desired to deliver the cakes upon pans, they may be placed upon the apron behind the dough-box, and be carried by it underneath the knives, to receive the cakes.

The mechanism to regulate the pressure in the dough-box is constructed as follows, viz:

A cam, $p$, placed upon the main shaft $f$, actuates a horizontal lever, $p^1$, pivoted upon a pin, $p^2$, fixed in the main frame, and connected by a link, $p^3$, with a pawl, $r$, which is pivoted at $r^1$, and engages with a ratchet-wheel, $r^2$, fast to the counter-shaft $c^7$, to which the ratchet for driving the follower is also attached at the other end.

The cam $p$ is adjustable in position upon the shaft $f$ by a set-screw, $s$, so that the pawl $r$ may be adjusted to be lowered, when required, to arrest the upward movement of the follower, caused by the elasticity of the dough, after the follower is released from the action of its working-pawl $c^5$.

The mechanism for preventing breakage, occasioned by the follower coming in contact with the bottom of the dough-box, is constructed as follows, viz:

The working-pawl $c^5$, which moves the follower, is connected by a cord, $t$, or other flexible connection, with one of the arms of a bell-crank lever, $u$, pivoted upon a stud-pin, $u^1$, in a bracket, $u^2$, upon the top of the frame.

The other arm of the bell-crank is connected by a joint to one end of a sliding rod, $w$, the other end of which slides in a bracket-guide, $w^1$, attached to the frame.

A spiral spring, $w^2$, encircles the sliding rod $w$, and actuates it in a direction to move the bell-crank lever to lift the working-pawl from its ratchet.

The sliding rod is held in place against the action of the spring by a latch, $x$, pivoted upon the vertical standard $x^1$, the latch engaging with a catch, $x^2$, on the sliding rod, so that, when latched, the bell-crank $u$ is held in position to allow the working-pawl to engage with its ratchet, and move the follower.

When the follower has been moved downward in the dough-box as far as advisable, the latch is unlatched from the sliding rod by an arm, $y$, secured to a vertical rod, $y^1$, attached to and projecting upward from the rack-rod which operates the follower.

The unlatching-arm $y$ is adjustable, being secured to the vertical rod by screw-nuts, $y^2$ $y^3$, the rod having a screw-thread cut upon it for that purpose.

When the sliding rod is unlatched, by the arm $y$ coming down upon the latch, the spring immediately moves the sliding rod and bell-crank to lift the working-pawl from its ratchet-wheel, so that it cannot engage therewith to move the follower any further down, and thereby prevents breakage of the machine.

If the machine be driven by a belt, the sliding rod $w$ may be connected with a belt-shipper, to shift the belt from the driving-pulley, but we prefer to use the connection with the working-pawl, because no breakage can occur if the pawl be not engaged with the ratchet to move the follower.

We claim, as of our invention and improvement in machines for making ginger-snaps, cakes, crackers, &c., wherein the dough is pressed by a follower through a grating in a dough-box, cut off by knives, and delivered in cakes upon a carrying-apron, the following, viz:

1. The intermittent progressive motion of the follower, in combination with the intermittent reciprocating motion of the knives, and the intermittent progressive motion of the apron, when said motions are derived from and are timed by a rotating shaft, or first mover, connected with the follower, the frame of knives, and the carrying-apron by mechanical devices, substantially in the manner described.

2. The intermittent progressive motion of the follower, in combination with the intermittent progressive motion of the carrying-apron, when said motions are derived from and are timed by a rotating shaft, or first mover, connected with the follower and carrying-apron by mechanical devices, substantially as described.

3. In combination with the main driving-shaft, or first mover and the frame of knives, the eccentric, with its strap and rod, the four-toothed ratchet-wheel and its pawl, and the short crank-shaft and crank-connections, whereby the knives are made to move forward and back during one-half a revolution of the machine, and to remain at rest during the other half revolution, substantially as and for the purposes described.

4. The regulating-mechanism, substantially as hereinbefore described, in combination with the mechanism for moving the follower downward in the dough-box, whereby the pressure of the follower upon the dough is regulated, substantially as hereinbefore described.

5. The mechanism for preventing breakage, substantially as herein described, in combination with the follower and its actuating-mechanism, whereby the follower is relieved from the action of its actuating-mechanism when it has descended to near the bottom of the dough-box, substantially as described.

JOHN McCOLLUM.
JOSEPH PARR.

Witnesses:
F. C. TREADWELL, Jr.,
J. W. CAMPBELL.